US012188644B2

(12) United States Patent
Hierzer

(10) Patent No.: US 12,188,644 B2
(45) Date of Patent: Jan. 7, 2025

(54) FASTENING DEVICE TO SECURE A LIGHTING ASSEMBLY AND LIGHTING ARRANGEMENT WITH AT LEAST ONE OF THIS TYPE OF FASTENING DEVICE

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 0 days.

(21) Appl. No.: 18/142,380

(22) Filed: May 2, 2023

(65) Prior Publication Data

US 2023/0349541 A1 Nov. 2, 2023

(30) Foreign Application Priority Data

May 2, 2022 (DE) ......................... 102022204322.7

(51) Int. Cl.
*F21V 21/34* (2006.01)

(52) U.S. Cl.
CPC .................................... *F21V 21/34* (2013.01)

(58) Field of Classification Search
CPC ........ F21V 17/164; F21V 21/34; F21V 17/04; F21V 17/02; F21V 17/00; F21V 17/002; F21V 17/005; F21V 17/007; F21V 17/06; F21V 17/08; F21V 17/166; F21V 17/168; F21V 19/00; F21V 21/00; F21V 17/107; F21V 17/108
See application file for complete search history.

(56) References Cited

U.S. PATENT DOCUMENTS

2005/0002182 A1 1/2005 Kotovsky et al.
2005/0152132 A1 7/2005 Bernhart et al.

FOREIGN PATENT DOCUMENTS

CN 105570743 A 5/2016
CN 105570743 B 6/2018
CN 208504008 U 2/2019
DE 3811128 A1 10/1989
DE 102011051038 A1 * 12/2012 .............. F21K 9/56
EP 1801495 A2 6/2007

OTHER PUBLICATIONS

2012.*
Office Action in corresponding Austria Application No. 1B A 50313/2022 dated Jun. 20, 2024 (3 pages).
English Translation of CN 105570743.
English Translation of CN 208504008.
English Translation of DE102011051038A1.

* cited by examiner

*Primary Examiner* — Elmito Breval
(74) *Attorney, Agent, or Firm* — Millen, White, Zelano, & Branigan; Christopher Kilner

(57) ABSTRACT

A fastening device fastens a lighting assembly in an elongate rail profile open on one longitudinal side. The fastening device is set up to be mechanically coupled to the lighting assembly and has a body through which the lighting assembly can be overlapped in sections from a rear side area of the same, which is facing away from a light output side of the lighting assembly. The fastening device has latching elements which are formed to engage behind an edge or undercut running along the rail profile in a latching manner. The fastening device has an actuating element that, when the fastening device is holding the lighting assembly inserted into the rail profile in this position, can be actuated by an operator from the open longitudinal side in order to move each of the latching elements into a release position.

21 Claims, 8 Drawing Sheets

FASTENING DEVICE TO SECURE A LIGHTING ASSEMBLY AND LIGHTING ARRANGEMENT WITH AT LEAST ONE OF THIS TYPE OF FASTENING DEVICE

FIELD OF THE INVENTION

The invention relates to the field of lighting arrangements, for example for lighting purposes in buildings. In particular, the invention relates to the field of profile lights and/or profile lighting systems. The invention relates to a fastening device for fastening a lighting assembly in an elongate rail profile open on one longitudinal side, and to a lighting arrangement with a rail profile, a lighting assembly and a fastening device of this type.

TECHNICAL BACKGROUND

Profile lights and profile lighting systems have already been proposed. In the case of these types of conventional profile lights or profile lighting systems, provision is often made, for example, for lighting inserts to be delivered to the construction site where assembly is to take place with a permanently pre-installed profile. These types of lighting inserts are usually wired to a converter or control device that is built into this profile or is located outside of the profile. If the lighting inserts are to be inserted into the profile on the construction site at a later date, the cabling is also cumbersome if using conventional construction methods.

SUMMARY OF THE INVENTION

Against this background, an object of the present invention is to make the assembly and disassembly of lighting inserts or lighting assemblies in profiles, for example to create a profile light or a lighting arrangement based on a profile lighting system, easier and more flexible.

According to the invention, this object is achieved by a fastening device with the features of Claim 1 and/or a lighting arrangement with the features of Claim 17.

Accordingly, a fastening device for fastening a lighting assembly in an elongate rail profile open on one longitudinal side is proposed. The fastening device is set up to be mechanically coupled to the lighting assembly and has a body through which the lighting assembly can be overlapped in sections from a rear side area of the same, which is facing away from a light output side of the lighting assembly. The fastening device has latching elements which are formed to engage in a latching manner behind an edge running along the rail profile or an undercut of the rail profile running along the rail profile. Furthermore, the fastening device has an actuating element or actuating elements which, when the fastening device is holding the lighting assembly inserted into the rail profile in this position, can be actuated by an operator from the open longitudinal side of the rail profile in order to move each of the latching elements into a release position by releasing each latching element from the edge or the undercut.

Furthermore, a lighting arrangement with an elongate rail profile open on one longitudinal side, a lighting assembly and at least one fastening device according to the invention is proposed. In this case, the lighting assembly is inserted into the rail profile and held in place by means of the at least one fastening device. The fastening device is mechanically coupled to the lighting assembly and the body of the fastening device overlaps the lighting assembly in sections from a rear side area thereof, wherein the rear side area faces away from a light output side of the lighting assembly. Furthermore, it is provided that the latching elements each engage in a latching manner behind an edge running along the rail profile or an undercut of the rail profile running along the rail profile and that the fastening device is thereby held in the rail profile.

One of the ideas on which the invention is based is that in this way, the lighting assembly can be used quickly, easily and flexibly in the manner of an insert or insets by the fitter, in particular at any desired point along an already installed rail profile, and can be removed again just as easily and quickly after releasing the locking connection by means of the actuating element or the actuating element. The fact that the body of the fastening device reaches behind the lighting assembly from the rear side area also contributes to the simple, quick and stable insertion of the lighting assembly in the correct alignment.

Advantageous embodiments and developments of the invention are described in the further dependent claims and the description, with reference to the figures in the drawing.

In one embodiment, the latching elements can be locked at least in the release position by means of the actuating element. In particular, this advantageously makes it easier to remove the lighting assembly from the rail profile for dismantling.

In one embodiment, the fastening device has two latching elements on opposite sides of the body, by means of which edges or undercuts provided in the rail profile on opposite sides of the rail profile can be gripped from behind. In this embodiment, the latching elements can be released jointly from the edge or the undercut by actuating one actuating element. This enables the latching elements to be fastened reliably and released conveniently when required.

In one embodiment, the actuating element is formed to be rotatable for release. This creates a convenient actuating means which also requires only a little space.

In one embodiment, it is provided that the actuating element can be rotated within an angular range about an axis that runs parallel to a depth direction of the rail profile, and in particular that the latching elements can be released by rotating the actuating element through an angle of between 80 degrees and 100 degrees, preferably about 90 degrees. This twisting action can easily be accomplished by the operator from the open longitudinal side.

According to a development, a first force application section is connected to the latching elements and is provided on an inner side of the latching element facing the actuating element or on a body section connected to the latching element. Furthermore, in this development, the actuating element has a shaft section which is formed on one end face thereof with a geometric shape for actuation by the operator by hand and/or by means of a tool. In addition, in this development, the actuating element has an extended, in particular partially disc-like area extending from the shaft section with second force application sections, each of which is formed to interact with the first force application section of one of the latching elements. The mechanical arrangement, by means of which a movement of the actuating element acts on the latching elements, is in this case arranged in a reliably protected manner and is embodied in a stable and mechanically reliable manner.

In one embodiment, the actuating element, in particular on the extended section thereof, has a plurality of contours on the actuating element side which are arranged at a distance from one another and are set up in such a way that at least two of the contours on the actuating element side can be engaged in a detachable manner with a body-side contour provided on the body and can in particular be arranged in a spring-loaded manner to create haptic feedback in at least two different positions of the actuating element and/or to lock the actuating element in at least two different positions thereof. This contributes to an even more convenient usability of the actuating element. In particular, the assembly and disassembly of the lighting assembly in the rail profile is even easier and more convenient, and the end positions of the actuating element can be felt even more clearly by the operator.

According to one embodiment, it can be provided that the fastening device has two latching elements on opposite sides of the body and that the fastening device has two actuating elements, each of which is associated with one of the latching elements. This can help to simplify the structure of the fastening device.

In one embodiment, the actuating elements for releasing one of the latching elements can be pressed outwards by the operator, in each case essentially parallel to a transverse direction of the rail profile. This movement can also be easily achieved by the operator from the open longitudinal side.

In one embodiment, the actuating elements are each connected as one piece to an assigned latching element and can be pivoted, preferably elastically pivoted, together with the latter in each case about a pivot axis that runs essentially parallel to a longitudinal direction of the rail profile in order to release the latching element from the edge or undercut. In this way, the manufacture of the fastening device can be simplified even further.

According to a development, the fastening device can be latched to the lighting assembly for mechanical coupling to the latter. This enables the lighting assembly to be mechanically coupled in a simple, time-saving and reliable manner.

In one embodiment, the fastening device can be mechanically coupled, in particular latched, to a housing component or a reflector or a printed circuit board with LED devices on the lighting assembly. This can help to simplify the construction of a lighting arrangement.

According to a development, the fastening device is formed to engage behind opposite longitudinal edges of the housing component or reflector or opposite longitudinal edges of the printed circuit board in a latching manner.

In one embodiment, the body of the fastening device at least partially has a U-shaped cross-section wherein a section of the lighting assembly can be accommodated in an inner area of the U-shape. This advantageously enables stable and reliable accommodation of and coupling with the lighting assembly. In addition, the lighting assembly can be protected and guided in this way due to the shape of the body when inserted into the rail profile; furthermore, the alignment of the lighting assembly in the rail profile can be stabilised with the aid of the U-shaped shape of the body.

In a development, it is provided that the body of the fastening device is set up for mechanical coupling to the lighting assembly and the latching elements are formed on the body, and that one actuating element is provided as a separate component and is movably mounted on the body, or the latching elements are each formed integrally with and elastically movably connected to the body together with an allocated actuating element. The separately provided actuating element can contribute to the achievement of smooth movability, whereas the integral design of the actuating elements with the body can also simplify manufacturability.

In a further development, the rail profile can be closed at least in certain areas with an insertable cover on the open longitudinal side of the rail profile, in which the lighting assembly can be fastened by means of the fastening device. This helps to give a lighting arrangement an aesthetic appearance, can help to adjust the light output as required using the cover, protects the lighting assembly from dirt and dust and can help to prevent unwanted access to the lighting assembly.

In one embodiment of the lighting arrangement, the rail profile can be closed at least in certain areas on the open longitudinal side by means of an insertable cover, or is closed at least in certain areas. The advantages of this embodiment have already been explained above.

In a development of the lighting arrangement, it is provided that the actuating element extends through an access opening in a printed circuit board of the lighting assembly, or that the actuating elements are each connected to an associated latching element on the side of a printed circuit board of the lighting assembly. The latching element(s) and the edge(s) which can be gripped from behind or the undercut(s) that can be gripped from behind can thus be accommodated advantageously in a space-saving manner on the back of the light panel, without interfering aesthetically or affecting the light output.

In one embodiment of the lighting arrangement, an electrical conductor means for the provision of an electrical supply voltage and/or control signals is arranged on the rail profile, in particular in the area of a base thereof. In this embodiment, the lighting assembly is formed as a unit, comprising a printed circuit board, a control device and a contacting device for contacting conductors of the electrical conductor means, and is connected to the at least one fastening device, preferably with two or more fastening devices, wherein the module formed in this way is held in the rail profile by means of the at least one fastening device, preferably by means of two or more fastening devices. Such a lighting arrangement is advantageously easy and flexible to install. For example, the rail profile can be mounted in advance and the module can then be used without difficulty, in particular at any point along the rail profile. A position adjustment in the longitudinal direction of the rail profile can also be enabled, which contributes to a flexible construction.

In one embodiment, the cover is formed as a piece that can be inserted separately into the rail profile and is partially or completely translucent.

In a further embodiment of the lighting arrangement, two or more lighting assemblies are held in the rail profile, in particular at the front and preferably adjoining one another, essentially without a gap. Furthermore, in this embodiment, the cover extends along a longitudinal direction of the rail profile over more than one of the lighting assemblies. This makes it possible to line up a number of lighting assemblies as inserts (insets), in particular essentially seamlessly. The interior of the rail profile with the inserted inserts can then be covered with a continuously translucent cover, thereby creating a continuous band of light. The band of light produced in this way can be several meters long, for example.

The embodiments and updated versions described above can be combined in any way where appropriate. Further possible embodiments, updated versions and implementations of the invention also include combinations of features of the invention described above or below with regard to the exemplary embodiments which are not explicitly mentioned. In particular, the person skilled in the art will also add individual aspects to the respective basic form of this invention as improvements or additions.

It goes without saying that the embodiments and developments described above with regard to the fastening device can be applied in an analogous manner to the lighting arrangement, and vice versa.

BRIEF DESCRIPTION OF THE DRAWINGS

The invention is explained in more detail below with reference to the exemplary embodiments shown in the figures of the drawings. The following are depicted.

The accompanying drawings are provided to clarify the embodiments of the invention. They illustrate the embodiments and, together with the description, serve to explain the principles and concepts of the invention. Other embodiments and many of the mentioned advantages will become apparent when consulting the drawings. The elements of the drawings are not necessarily shown at the same scale.

In the figures, elements, features and components which are identical and which have the same function and effect each have the same reference signs, unless otherwise stated.

DESCRIPTION OF EMBODIMENTS OF THE INVENTION

Figure 1:
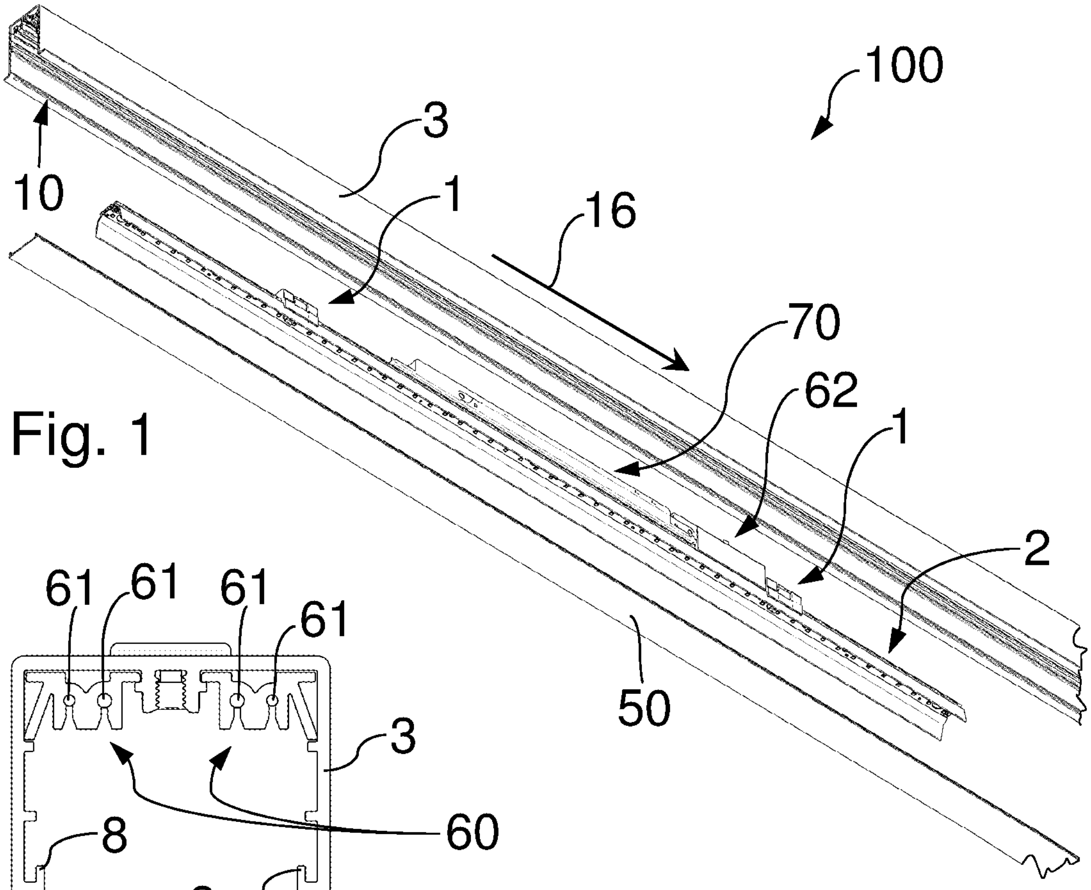
FIG. 1 an exploded view of a part of a lighting arrangement according to a first exemplary embodiment with a rail profile, a lighting assembly, fastening devices and a cover, seen from the perspective of a visible side.
Figure 5:
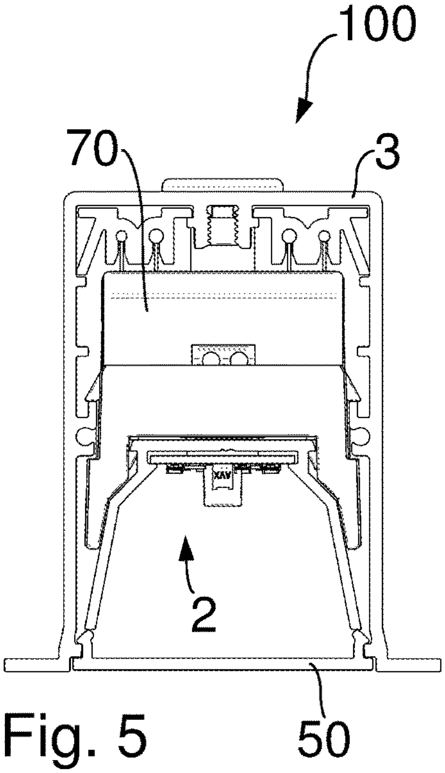
FIG. 5 the assembled lighting arrangement according to the first exemplary embodiment.
Figure 7:
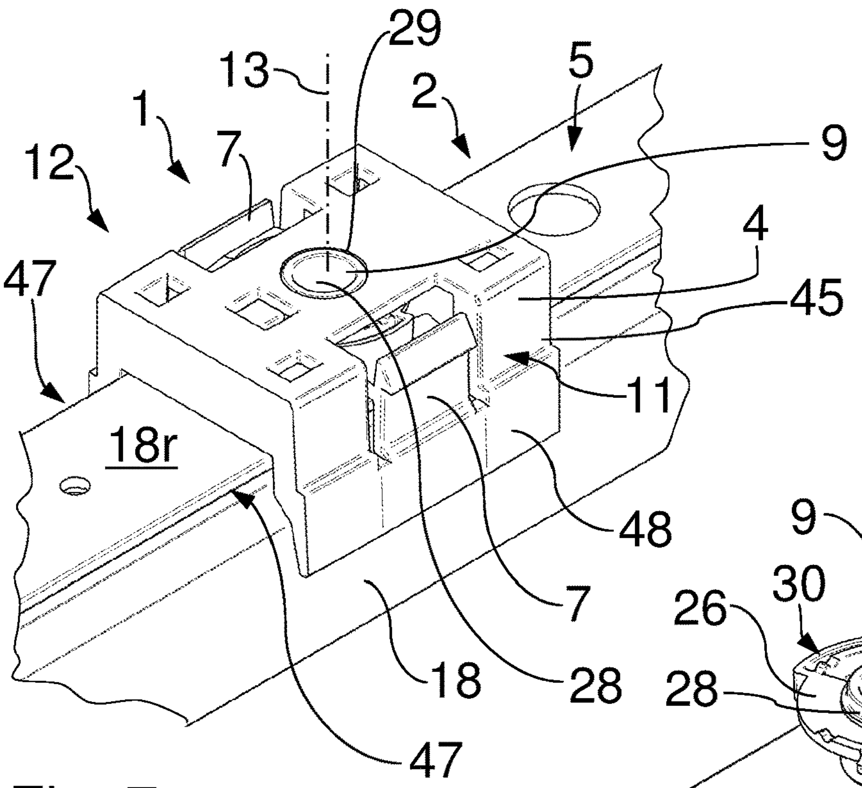
FIG. 7 a rear perspective view of a short section of the lighting assembly provided in the first exemplary embodiment, with a fastening device mounted thereon.
Figure 8:
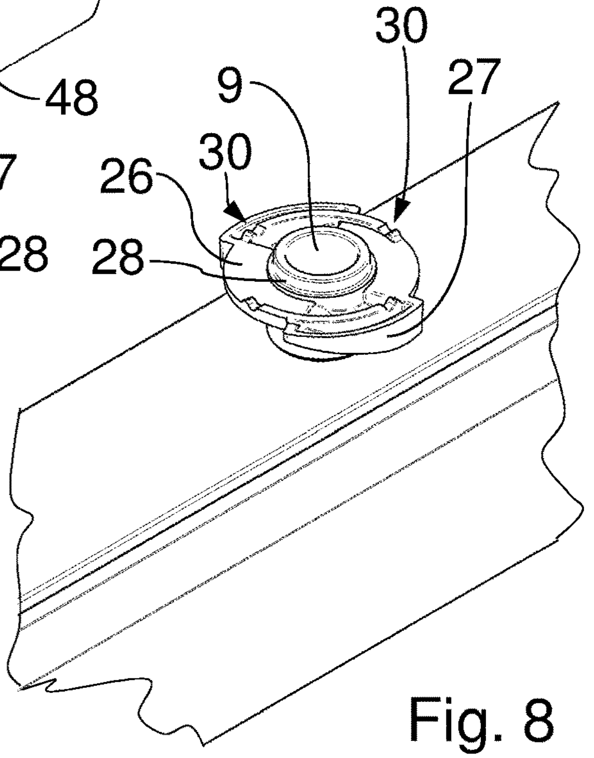
FIG. 8 the situation of FIG. 7, wherein a body of the fastening device is omitted for clarity.

FIG. 1 shows part of a lighting arrangement 100 according to a first exemplary embodiment, partially in an exploded view. The lighting arrangement 100, shown in the assembled state in FIG. 5, shows an elongate rail profile 3 with a longitudinal direction 16, a lighting assembly 2 with an elongated design and an elongate cover 50. The lighting arrangement 100 can be part of a profile lighting system. For example, the lighting arrangement 100 can be embodied as a continuous band of light with a length, along the direction 16, of several meters.

The rail profile 3 has an open longitudinal side 10 which is arranged on a visible side of the arrangement 100 in a mounted state. For example, the open longitudinal side 10 faces a room that is to be illuminated. The open side 10 can be an underside of the assembled arrangement 100.

The profile 3 can be closed by the cover 50 on the open longitudinal side 10, wherein the cover 50 is separately insertable into the rail profile 3 and is designed to be translucent in some areas or preferably fully translucent.

In the first exemplary embodiment, the cover 50 is provided with rib-shaped projections on its inner side along the longitudinal edges of the cover 50, which allow snapping or latching into the profile 3 in order to attach the cover 50 to it.

For example, a length of the cover 50 can essentially correspond to a length of the profile 3 along the direction 16 such that the open side 10 is essentially completely closed by the cover 50. Light provided by the lighting assembly 2 is emitted through the cover 50 for the purpose of illumination. Several individual covers 50 lined up in a row are also conceivable.

While only one lighting assembly 2 is shown in FIG. 1, two or more essentially identical lighting assemblies 2 can be arranged adjacent to one another on the front side and essentially without a gap within the rail profile 3. In this case, the cover 50 extends in the longitudinal direction 16 across a plurality of lighting assemblies 2.

The cross-section of the rail profile 3 is essentially U-shaped with side walls 3*a*, 3*b* and a middle section connecting them. An electrical conductor means 60 with conductors 61, which are held by insulating support bodies, is arranged on a base of the rail profile 3, in the area of the middle section interconnecting the walls 3*a*, 3*b*. The conductors 61 are provided for the provision of an electrical supply voltage and control signals.

In the first exemplary embodiment, the lighting assembly 2 is formed as a unit with a printed circuit board 19, a control device 70 and a contacting device 62 as well as a channel-like component 18 and is connected with, for example, two fastening devices 1 to form a module (inset). In variants of the exemplary embodiment, more than two fastening devices 1 can be provided, wherein an embodiment with only one fastening device 1 is also conceivable if the length of the lighting assembly 2 is relatively short.

The contacting device 62 is embodied with contact elements 63 which come into electrically conductive contact with the conductors 61 when the module with the lighting assembly 2 is inserted into the profile 3. In this case, each contact element 63 makes contact with one of the conductors 61, wherein four conductors 61 and four contact elements 63 are provided in the first exemplary embodiment for the provision of the supply voltage and a DALI signal. Specifically, in FIG. 2 the two outer conductors 61 on the side can deliver a DALI signal, while the inner two conductors deliver the neutral and phase of an AC voltage supply, roughly in the following order from left to right: DALI—phase—neutral—DALI. When the profile 3 is in a mounted state in the ceiling area, the electrical conductor means 60 is arranged in an upper area thereof.

Figure 9:
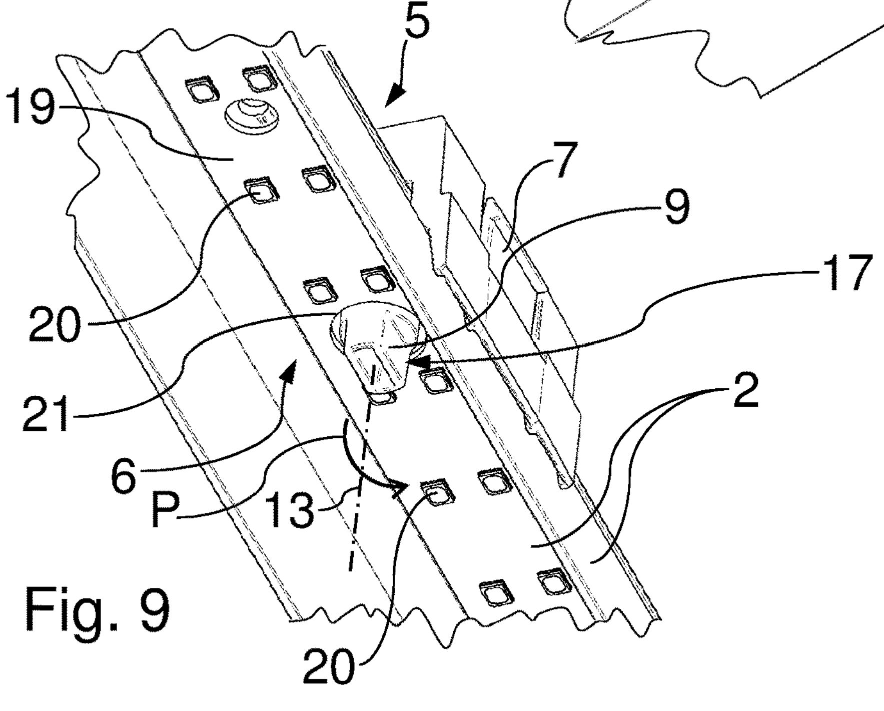
FIG. 9 the situation of FIG. 7 in a different perspective view from a light output side of the lighting assembly.

A multiplicity of LED devices 20 are provided on the elongate printed circuit board 19, see for example FIG. 9, and in particular, for example, conductor tracks for the operation of the LED devices 20.

By means of the contacting device 62 ("feeder"), the DALI signals and the supply voltage, which can be, for example, mains voltage, such as AC voltage with a nominal voltage between 100 V and 240 V, in particular between 220 V and 240 V, are picked off from the electrical conductor means 60 and transferred to the control device 70. In the case of mains voltage, the control device 70 is set up to convert the picked off AC power into a voltage with a suitable type of current appropriate for the operation of the lighting assembly 2 and in particular of the LED devices 20 thereof.

The control device 70 and the contacting device 62 are arranged on the rear of the component 18 and are in particular connected to it.

The printed circuit board 19 is accommodated in the channel-like component 18 which is formed as a reflector 18 to direct the light emitted by the LED devices 20 during operation towards the open side 10. The component 18 can in particular also be regarded as a type of housing component for accommodation of the printed circuit board 19.

The fastening devices 1 of the arrangement 100 are of identical design. The lighting assembly 2 with the printed circuit board 19, the control device 70, the contacting device 62 and the reflector 18 is held in the rail profile 3 by means of the fastening devices 1. When the arrangement 100 is assembled, after the rail profile 3 has been attached, for example in the ceiling area, the assembly 2 with the fastening devices 1 arranged thereon is inserted into the rail profile 3 from the open side 10, as a result of which the conductors 61 make contact with the contact elements 63. When fully inserted, the lighting assembly 2 is self-retaining in the profile 3, as will be described below. The cover 50 is then inserted. The assembly sequence is shown in FIGS. 2-5.

The fastening device 1 is mechanically coupled to the lighting assembly 2 by latching. The fastening device 1 is embodied with a body 4 with an essentially U-shaped cross-section. The body 4 is made of a plastic material, for example. The U-shape of the body 4 forms an inner area 44 thereof, see for example FIGS. 12 and 13.

The channel-like reflector 18 with the printed circuit board 19 accommodated therein is overlapped in the rear side area 5 of the lighting assembly 2 in a section thereof in the longitudinal direction 16. This is shown in particular in FIGS. 2, 3, 5, 7 and 9. The rear side area 5 faces away from a light output side 6 of the lighting assembly 2 on which the LED devices 20 are arranged on the printed circuit board 19.

The overlapped section of the lighting assembly 2, and in this case a longitudinal portion of the reflector 18 is accommodated in the inner area 44 of the body 4. The body 4 is mechanically coupled to the reflector 18 with the aid of four latching devices 46 which are arranged on the body 4 facing the inner area 44 and two of which engage behind one of two opposite upper, outer longitudinal edges 47 of the reflector 18 in a latching manner.

Figure 2:
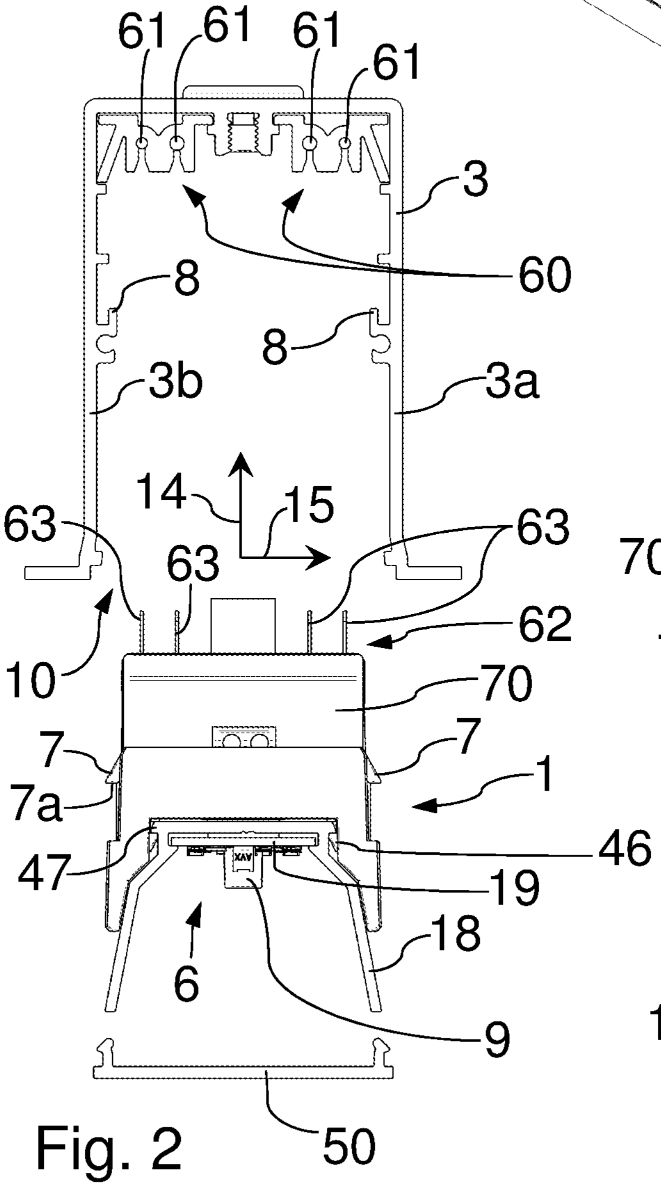
FIG. 2 a first step in assembling the lighting arrangement in FIG. 1 in a cross-section thereof.

The printed circuit board 19 is held at the edges in two opposite longitudinal grooves of the component 18, see FIG. 2.

The fastening device 1 has two elastically resilient latching elements 7 formed in one piece with the body 4 on opposite sides 11, 12 thereof. Each of the legs 45 is formed with a longitudinally connected area 48, one longitudinal boundary of which forms a free edge of the legs 45 and the other longitudinal boundary of which is integrally connected to the resiliently movable latching element 7 in a middle area, viewed in the longitudinal direction 16 when the arrangement 100 is in the mounted state.

The latching elements 7 are formed to engage behind an edge 8 running along the inside of the rail profile 3, or an undercut 8 of the rail profile 3 running along the inside of the rail profile 3 in a latching manner, and thereby to hold the lighting assembly 2 in the profile 3. The edges or undercuts 8 which the latching elements 7 engage behind are provided on opposite sides of the profile 3 on the inside on the opposite side walls 3*a*, 3*b*.

Figure 3:
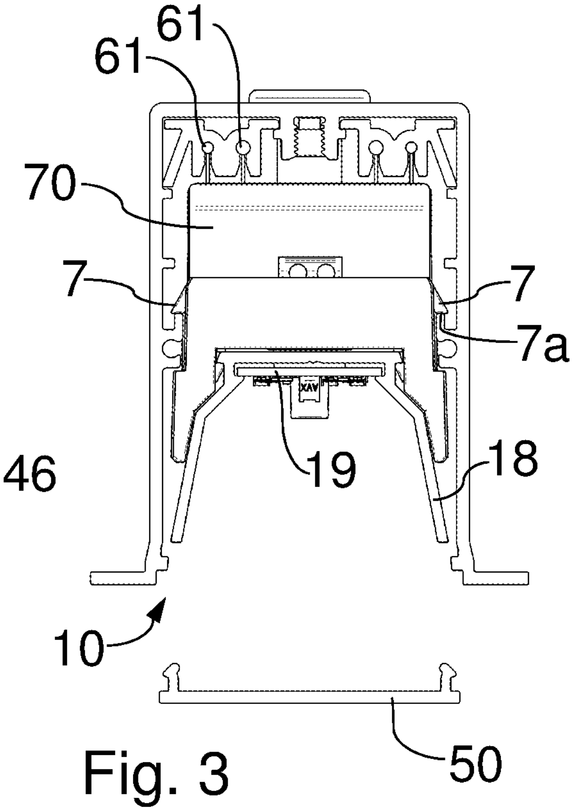
FIG. 3 a second step in assembling the lighting arrangement in FIG. 1 in a cross-section thereof.
Figure 6:
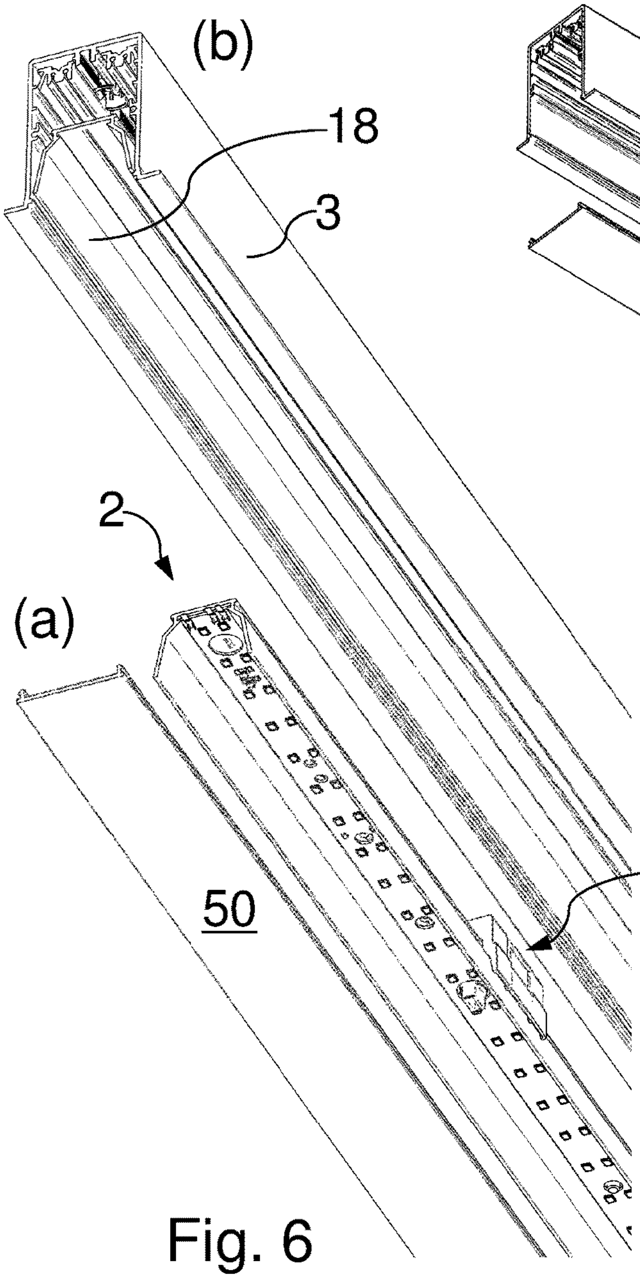
FIG. 6 in a partial image (a) the lighting assembly, the cover and a fastening device in a further perspective view of the visible side, and in a partial image (b) the rail profile of the lighting arrangement according to the first exemplary embodiment, in which a reflector of the lighting assembly without a printed circuit board is included for illustration.
Figure 4:
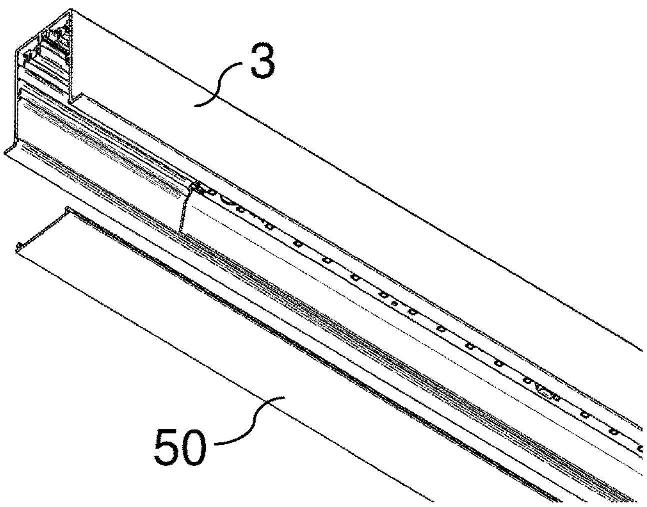
FIG. 4 the situation of FIG. 3 for a part of the lighting arrangement according to the first exemplary embodiment, viewed from the perspective of a visible side.

FIGS. 2 and 3, for example, also show that the latching edges 7*a* of the latching elements 7 that interact with the edges or undercuts 8 are arranged above or to the rear of a plane in which the printed circuit board 19 is accommodated in the inner area 44, viewed in the depth direction 14 of the profile 3.

The fastening device 1 also has an actuating element 9 which, in a state in which the fastening device 1, when inserted into the rail profile 3, holds the lighting assembly 2 in the profile 3, can be actuated by an operator from the open longitudinal side 10, provided that the cover 50 is not is used or removed.

The actuating element 9 is a part that is separate from the body 4 and is rotatably mounted on the body 4. By rotating the actuating element 9 about an axis of rotation 13 parallel to a depth direction 14 of the profile 3, see e.g. FIGS. 7 and 9, the latching elements 7 can be brought together and simultaneously moved into a release position in which they are each released from the edge 8 or the undercut 8. In order to release the latching elements 7, the actuating element 9 can be rotated about the axis 13 by an angle of between 80 degrees and 100 degrees, preferably about 90 degrees.

Figure 13:
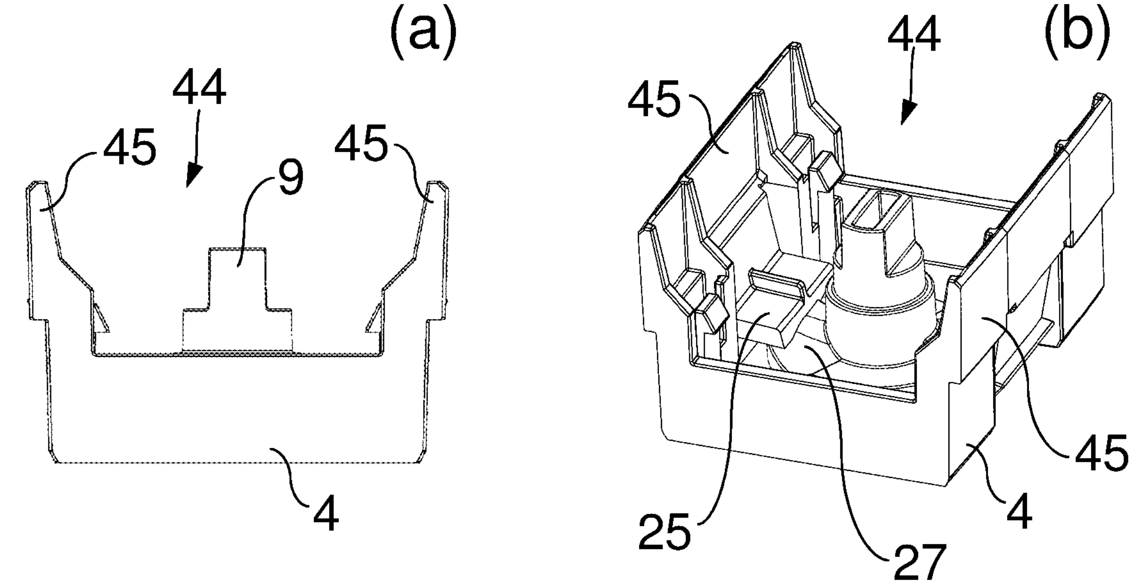
FIG. 13 the assembled fastening device, as provided in the first exemplary embodiment, in a second position of the actuating element, in which release from the rail profile is enabled, in a front view (a) and a perspective bottom view (b)
Figure 14:
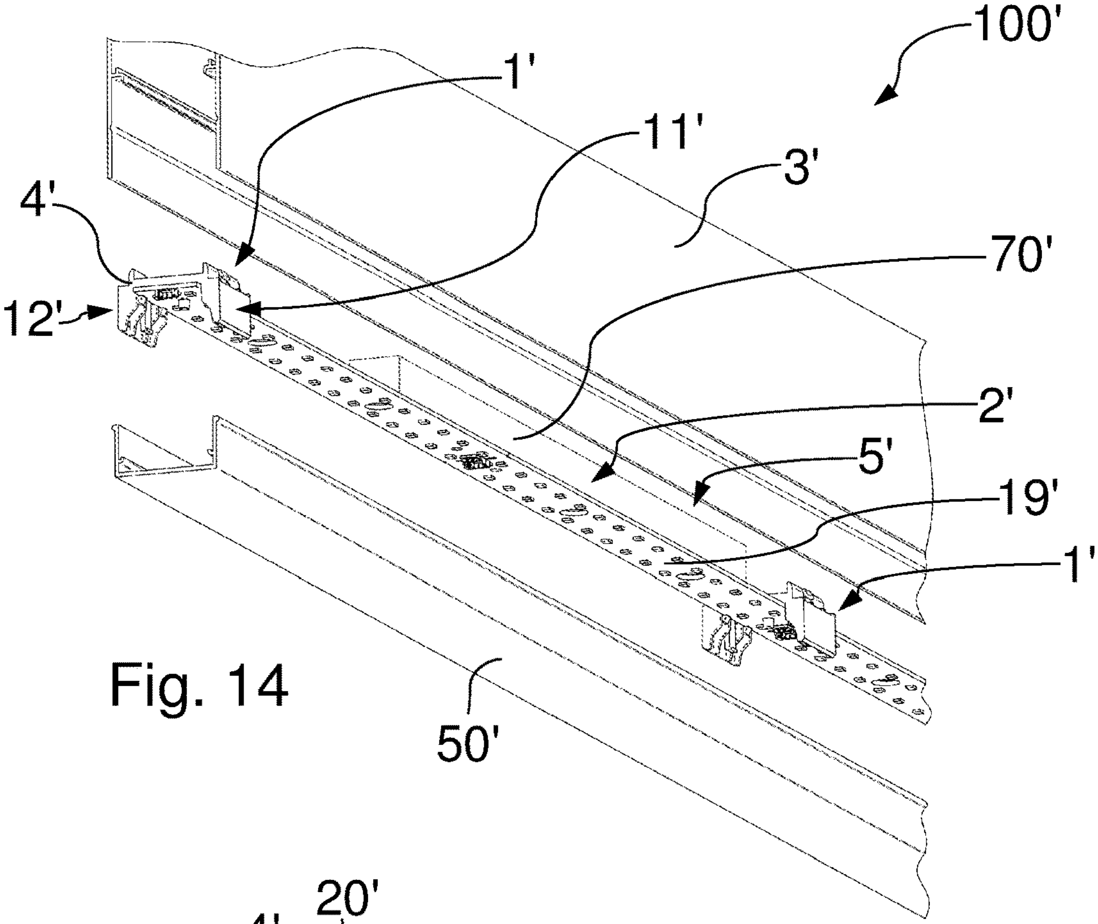
FIG. 14 an exploded view of a part of a lighting arrangement according to a second exemplary embodiment with a rail profile, a lighting assembly, fastening devices and a cover, seen in perspective view from a visible side.
Figure 16:
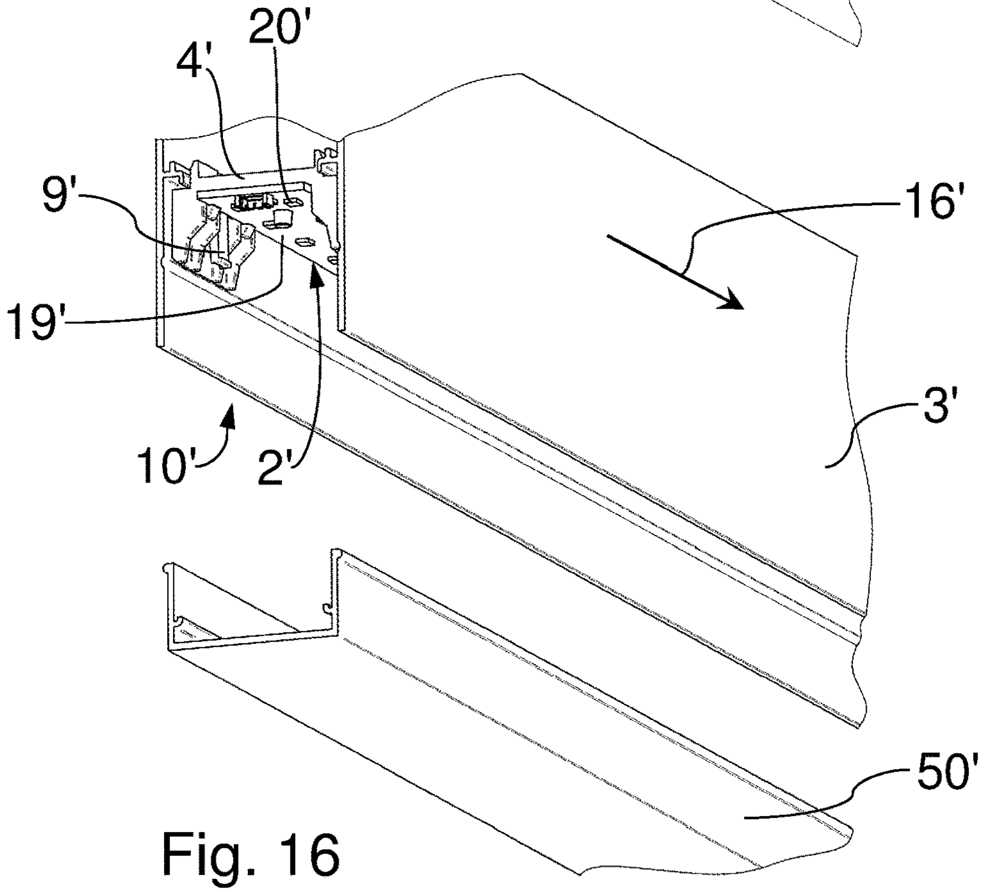
FIG. 16 a second step in assembling the lighting arrangement of FIG. 14, seen in perspective view from the visible side, for a part of the lighting arrangement to be formed.
Figure 15:
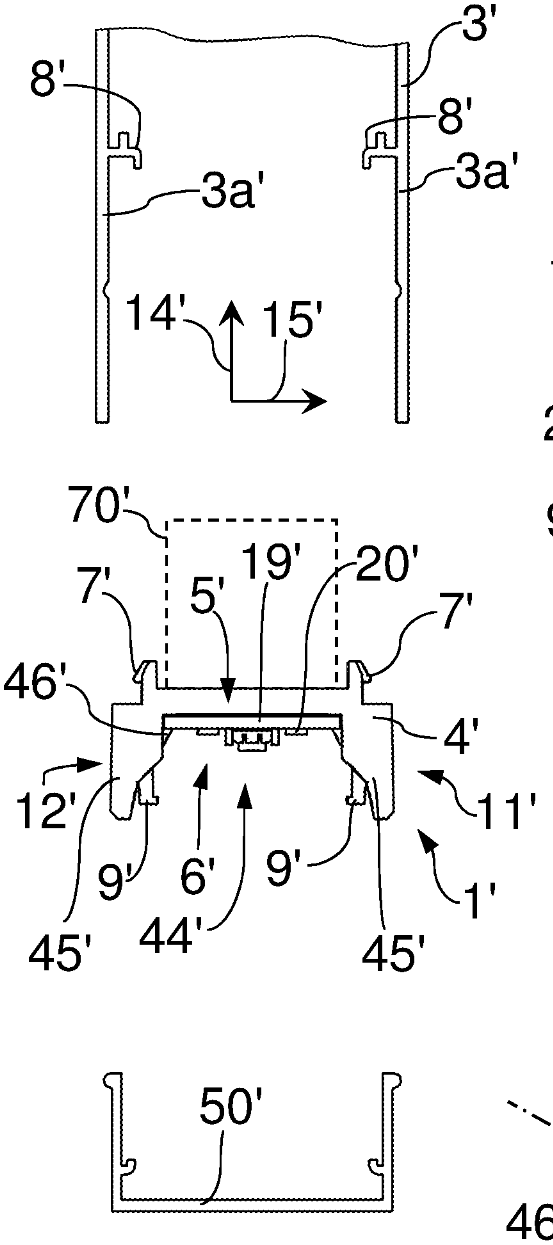
FIG. 15 a first step in assembling the lighting arrangement of FIG. 14 in a partial cross section thereof.
Figure 17:
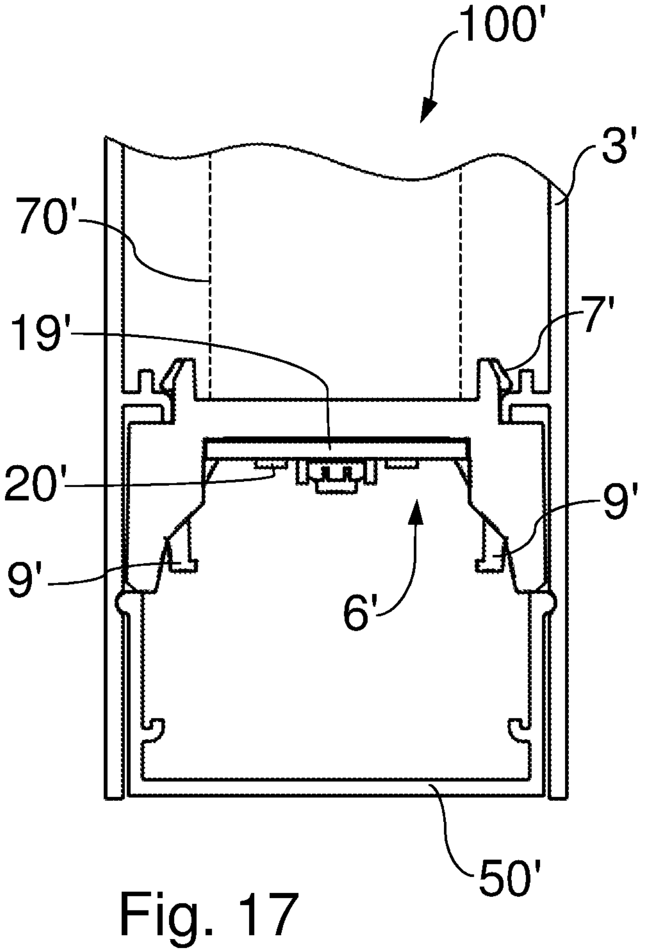
FIG. 17 the assembled lighting arrangement according to the second exemplary embodiment in a partial cross-sectional view.
Figure 18:
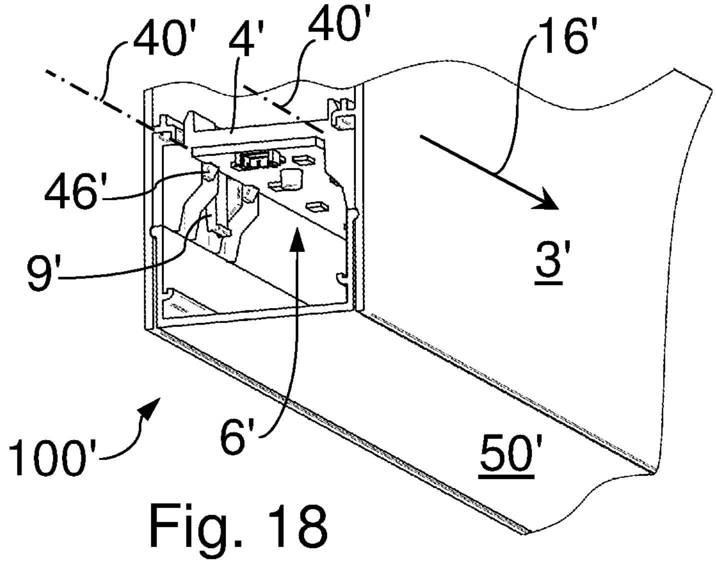
FIG. 18 the situation of FIG. 17 seen in perspective view from the visible side, for part of the lighting arrangement to be formed.
Figure 19:
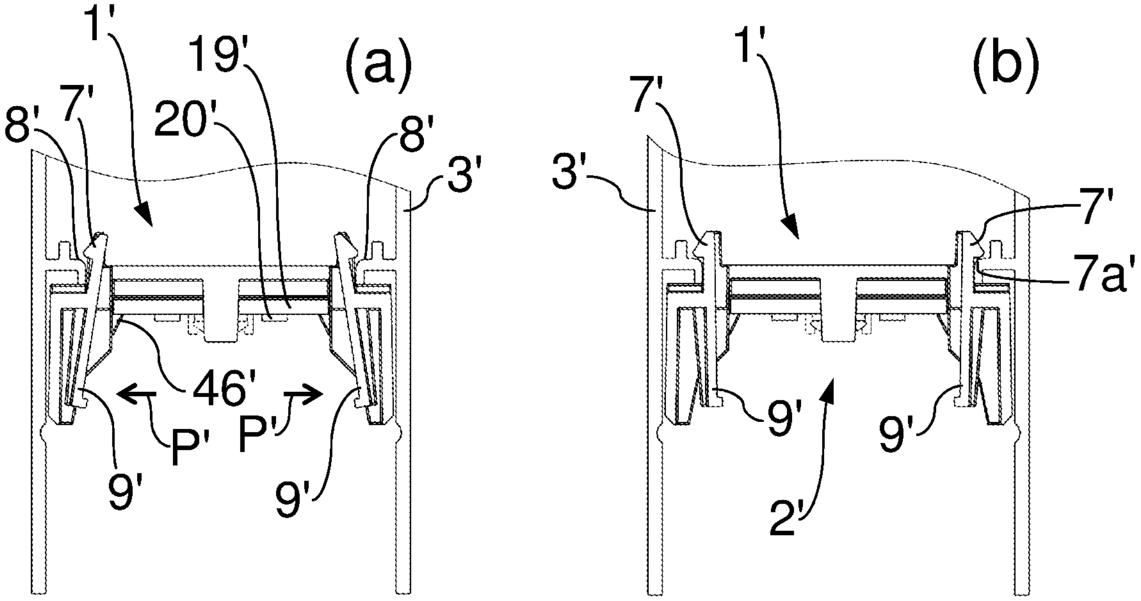
FIG. 19 a cross-sectional view of the rail profile, the lighting assembly and a fastening device according to the second exemplary embodiment, wherein the cover is omitted, seen in a cross-section through a body of the fastening device, wherein a partial image (a) shows a release position of two latching elements of the fastening device and a partial image (b) shows their latching position.

FIG. 13 shows the release position of the latching elements 7 achieved by rotating the element 9, whereby the latching elements 7 are pulled back toward the interior of the body 4. In this position of the latching elements 7, the lighting assembly 2 can be easily removed from the profile 3. The release position is also shown in FIG. 9, whereby arrow P schematically illustrates the rotation of the element 9 to reach this position.

Figure 12:
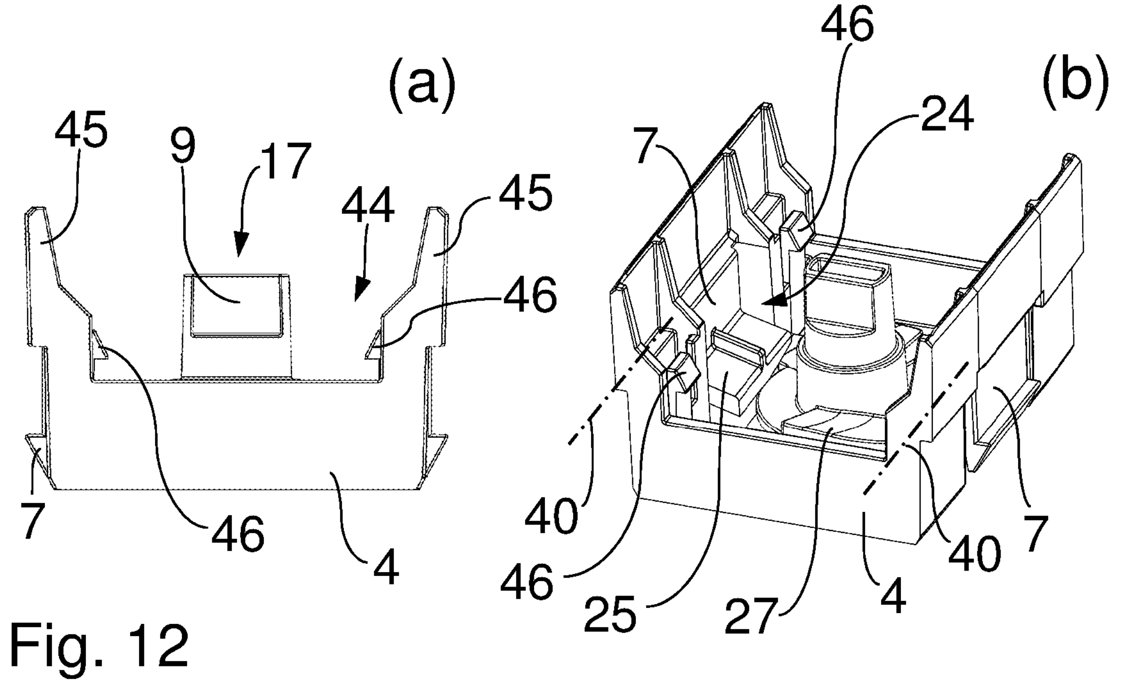
FIG. 12 the assembled fastening device, as provided in the first exemplary embodiment, in a first position of the actuating element, in which locking with the rail profile is enabled, in a front view (a) and a perspective bottom view (b)

In contrast, FIG. 12 shows a position of the actuating element 9 in which it is rotated by approximately 90 degrees in relation to FIG. 13. In the situation of FIG. 12, the wing-like latching elements 7 are not pulled back and fixed, but can move freely and flexibly. For the insertion of the lighting assembly 2 into the rail profile 3 for the assembly of the lighting arrangement 100, the actuating elements 9 of all of the fastening devices 1 on the lighting assembly 2 are brought into the position shown in FIG. 12. When the lighting assembly 2 is inserted, for example from below as shown in FIGS. 2 and 3, into the profile 3, the latching elements 7 spring back in a movable manner and snap into the latching edges 7*a* behind the edges or undercuts 8, as a result of which the lighting assembly 2 is connected to the profile 3. Provision can be made for the lighting assembly 2 to still be moveable, at least to a certain extent, in the rail profile 3 in the state in which it is latched in by means of the latching elements 7 in order to enable position corrections.

In order to release the module 2 from the track 3, the actuating elements 9 of all fastening devices 1 of the module 2 are rotated counter-clockwise by the intended angle of rotation, approximately 90 degrees, as a result of which the wing-like latching elements 7 are pulled inwards and fixed in the release position.

Figure 10:
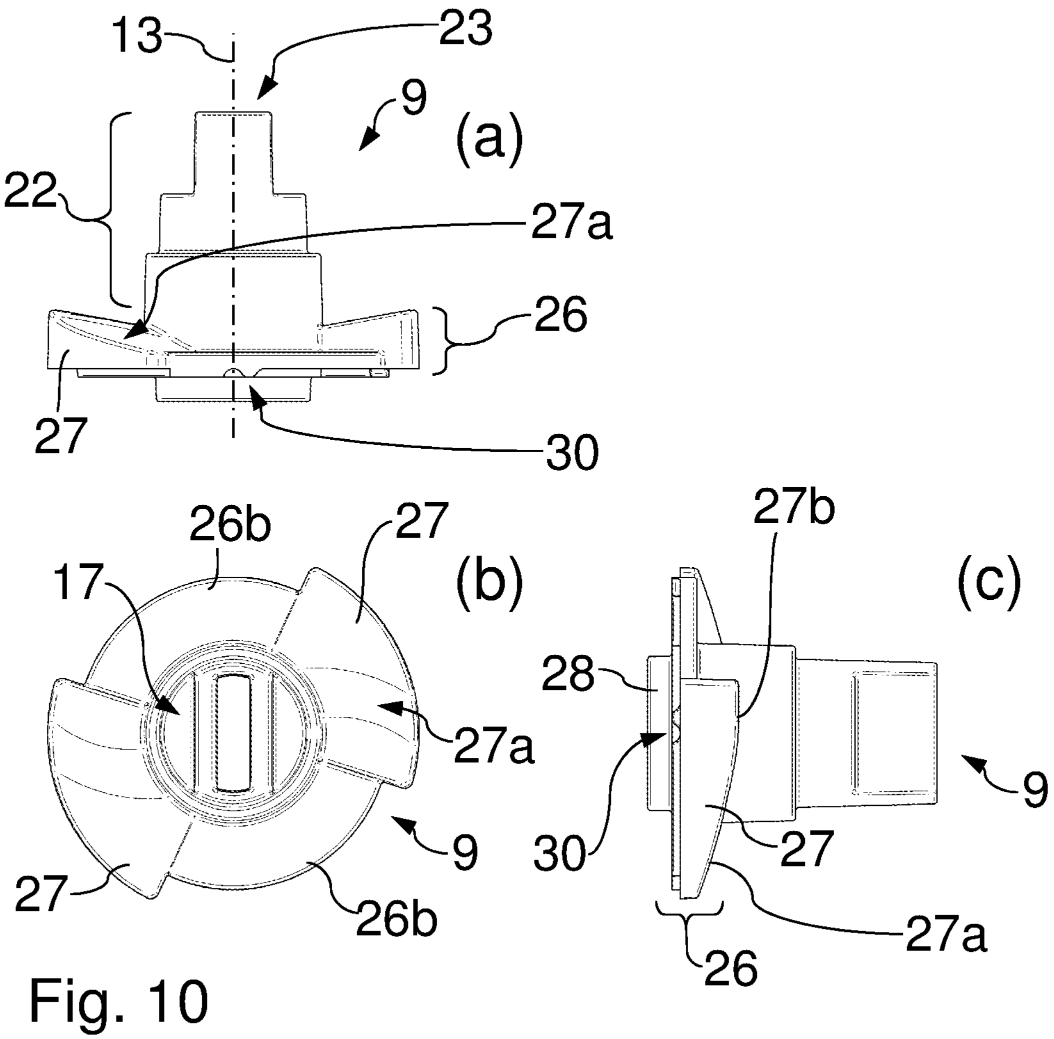
FIG. 10 an actuating element of the fastening device provided according to the first exemplary embodiment, in a front view (a), a top view (b) and a side view (c)
Figure 11:
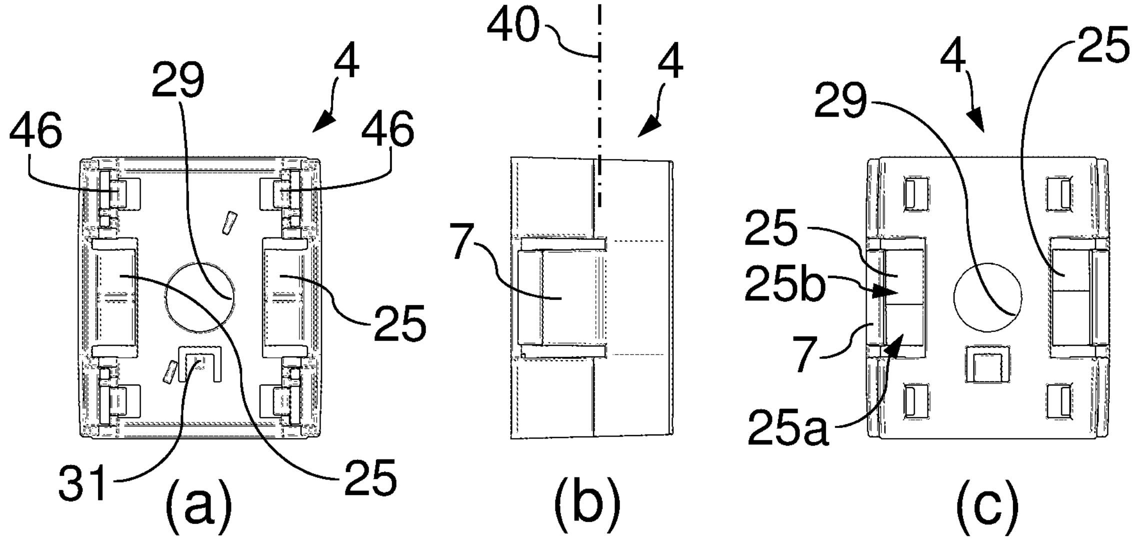
FIG. 11 a body of the fastening device provided according to the first exemplary embodiment in a bottom view (a), a side view (b) and a top view (c)

The actuating element 9, in particular shown in detail in FIG. 10, has a shaft section 22 which is embodied on an end face 23 thereof with a geometry 17 for actuation by the operator by hand and/or by means of a tool. In the first exemplary embodiment, the geometry 17 is formed with flat, parallel lateral surfaces for manual actuation and with a slot for engaging a tool, for example a screwdriver, in particular a flat-head screwdriver, see FIGS. 9 and 10. The actuating element 9 about the axis 13 can therefore be rotated without tools and/or by means of the tool.

The shaft section 22 of the actuating element 9 is guided through a channel in the component 18 and through a round access opening 21 in the printed circuit board 19 of the lighting assembly 2, which is positioned to correspond to this channel, in such a way that the end face 23 with the geometry 17 is accessible from the light output side 6 of the lighting assembly 2. See FIG. 9, which shows that the geometry 17 protrudes through the access opening 21 to the light output side 6.

From the shaft section 22, an extended area 26 of the actuating element 9, which is disk-like in some areas, extends circumferentially on the shaft section 22, see FIG. 10.

When the body 4 of the fastening device 1 is mechanically locked to the lighting assembly 2, the extended section 26 is accommodated between a rear side 18*r* of the reflector 18 and a section of the body 4 in the inner area 44 in a twistable manner. On a side of the extended section 26 facing away from the geometry 17, a short swivel pin 28 of the actuating element 9, which is accommodated in a twistable manner in an opening 29 of the body 4, extends centrally therefrom. The shaft section 22, the swivel pin 28 and the section 26 are essentially arranged coaxially along the axis of rotation 13.

With each of the latching elements 7, a plate-like section that protrudes inwards towards the inner area 44 and is mechanically stabilised, in particular by means of an additional rib, is integrally connected on an inner side 24 of the latching element 7 facing the actuating element 9 and is formed as a first force application section 25.

The expanded area 26 of the actuating element 9 is provided with two second force application sections 27 which are each formed to interact with the first force application section 25 of one of the latching elements 7. The force application sections 27 are each embodied with a ramp 27*a* which rises along part of the circumference of the section 26 towards the abutting face 23 and which merges into a flat-edged end section 27*b*. Radial outer edges of areas 26*b* of section 26 between adjacent force application sections 27 are set back from radial outer edges of sections 27 in the radial direction.

In the position of the actuating element 9 in FIG. 12, this prevents the first and second force application sections 25 and 27 from interfering with one another, as a result of which the latching elements 7 are each freely and flexibly movable about a pivot axis 40 and, when inserted into the rail profile 3, the latching elements 7 can slot behind the edges or undercuts 8. In the position of FIG. 13, on the other hand, the first and second force application sections 25 and 27 were brought into contact with one another by rotating the element 9. The continued rotation of the element 9 causes a compressive force to be exerted by the ramps 27*a* on the lower side of the force application sections 25 in FIG. 13, as a result of which latching element 7 is pivoted elastically around axis 40, which runs essentially parallel to longitudinal direction 16, in an inwards direction towards the inner area 44. As a result, the latching edges 7*a* are pulled back from the edges or undercuts 8 and the latching is released. The side of section 25 facing section 27 can also have a bevelled area 25*a* which merges into a flat area 25*b*.

In particular due to the provision of the flattened end section 27*b*, the actuating element 9 and the latching elements 7 in FIG. 13 remain in the release position even without the operator needing to do anything. This facilitates disassembly and the latching elements 7 are locked in the release position.

On one side of the extended section 26, which points in the same axial direction as the swivel pin 28 and, in the assembled state, points to a base of the internal space 44, the actuating element 9 is equipped with four contours 30 on the actuating element side, wherein these contours 30 are preferably arranged on a circular line concentric to the axis of rotation 13 distributed around the axis 13.

An elastically resilient contour 31 arranged on the body side is provided on the body 4 in the inner area 44. When the actuating element 9 is inserted, at least two of the contours 30 on the actuating element can be detachably engaged with the contour 31 on the body. The contours 30, 31 are engaged in the end positions of the actuating element 9 during rotation, i.e. in the positions of FIGS. 12 and 13. In this way, the operator experiences haptic feedback that the desired position has been reached, both in the latched position and in the release position. In some embodiments, the interaction of the contours 30, 31 could contribute to even better latching of the actuating element 9 in the respective end position. The contours 30, 31 thus in particular serve as contours to modify the haptics and/or latch the actuating element 9.

A second exemplary embodiment is illustrated in FIGS. 14-19. The differences compared to the first exemplary embodiment in particular are explained below.

A lighting arrangement 100' according to the second exemplary embodiment in turn has an elongate rail profile 3' open on a longitudinal side 10', a lighting assembly 2' and fastening devices 1' for holding the lighting assembly 2' inserted into the rail profile 3' in the profile 3', in addition to a separate cover 50'. The cover 50' is translucent in some areas or completely translucent and can be inserted into the rail profile 3' in a latching manner to close the open longitudinal side 10'. In an analogous manner to the first exemplary embodiment, the open side 10' can thus be closed at least partially, preferably essentially fully closed, along a longitudinal direction 16' of the profile 3' by means of the cover 50', and furthermore several lighting assemblies can be inserted adjacently at the end face into the profile 3' without a gap, whereby the cover 50' can extend in the longitudinal direction 16' over two or more lighting assemblies 2'.

The fastening devices 1' are of the same design and are each mechanically coupled by latching to an elongate printed circuit board 19' of the lighting assembly 2' equipped with LED devices 20'.

The fastening device 1' has a body 4' which is made of a plastic material, for example. The body 4' is preferably formed in one piece. The body 4' has a U-shaped cross-section with legs 45', as a result of which an inner area 44' is formed, in which a printed circuit board 19' of the lighting assembly 2' is accommodated. The printed circuit board 19' is hereby overlapped in sections by a rear side area 5' of the lighting assembly 2', which is pointing away from a light output side 6' of the lighting assembly 2'.

For the mechanical coupling of the body 4' to the lighting assembly 2', the body 4' has four latching devices 46' facing the inner area 44' thereof, which are set up to latch with the printed circuit board 19', wherein two of the latching devices 46' engage behind opposite longitudinal edges of the printed circuit board 19' in a latching manner.

In the second exemplary embodiment, an electrical conductor means 60 for the provision of an electrical supply voltage and/or control signals is also arranged at the base of the rail profile 3', which is not shown in FIGS. 14-19. In this regard, reference can be made to the above statements on the first exemplary embodiment, which can also be applied to the second exemplary embodiment. The lighting assembly 2' is thus supplied with operating voltage and control signals in the same way as the lighting assembly 2.

In a manner analogous to the first exemplary embodiment, the lighting assembly 2' is formed as a unit comprising the printed circuit board 19', an control device 70' arranged on the rear side of the printed circuit board 19' and a contacting device 62, as in the first exemplary embodiment, and is connected to a module with the fastening devices 1'. The module is held in the profile 3' by means of the fastening devices 1'.

Two latching elements 7' are provided on opposite sides 11', 12' of the body 4', which are formed in one piece with the body 4' and can each be pivoted elastically about an axis 40' on the latter. One of two edges 8' or undercuts 8' provided on opposite side walls **3*a*', 3*b*' of the rail profile 3' can be engaged in a latching manner by means of the latching elements 7'**.

The fastening device 1' also has two actuating elements 9', wherein each is assigned to one of the latching elements 7'. The two actuating elements 9' are in a state in which the fastening device 1' holds the lighting assembly 2' inserted into the rail profile 3' from the open longitudinal side 10' with the cover 50' not inserted or removed in order to bring the latching elements 7', which can be actuated by an operator, into a release position in which they are each released from the edge 8' or the undercut 8. In the release position of the latching elements 7', the module with the lighting assembly 2' can be removed from the profile 3'.

In contrast to the first exemplary embodiment, in which the release position is reached by rotating an actuating element, in the second exemplary embodiment, the inset module with the lighting assembly 2' can be released by pressing the two wing-like actuating elements 9' protruding towards the inner area 44'. The actuating elements 9' for releasing one of the latching elements 7' can hereby be pressed outwards by the operator, essentially parallel to a transverse direction 15' of the rail profile 3', see arrow P' in FIG. 19. The actuating elements 9' can be actuated independently of one another and the latching elements 7' can be released independently of one another, wherein simultaneous actuation by the operator when removing from the rail 3' may be expedient.

Each of the latching elements 7' is integrally connected to the associated actuating element 9' on the same side 11' or 12', wherein the part respectively formed with the actuating element 9' and the latching element 7' are embodied integrally with the body 4' and on the body 4' around the axis 40' which, in the assembled state of the arrangement 100', can be pivoted parallel to the longitudinal direction 16' of the profile 3'. The latching element 7' is released from the edge 8' or the undercut 8' by means of this pivoting movement.

The section formed in one piece with the actuating element 9' and the latching element 7' and arranged elastically on the body 4' extends in an unactuated and, see FIG. 9 (*b*), latched position essentially parallel to a depth direction 14' of the rail profile 3 ', thus essentially parallel to the allocated leg 45', and is arranged in a middle area of the leg 45', in each case opposite other sections of the leg 45' so as to be elastically pivotable.

The body 4' is formed in such a way that the actuating elements 9' are connected to the allocated latching elements 7' on the side of the printed circuit board 19'. The elastically movable section of the body 4' formed with the elements 7' and 9' thus extends past the longitudinal edges of the printed circuit board 19', see FIG. 19.

Latching edges **7*a*' of the latching elements 7 interacting with the edges or undercuts 8' are arranged above or to the rear of a plane in which the printed circuit board 19' is accommodated in the inner region 44', seen in the depth direction 14' of the profile 3'**.

In the exemplary embodiments described above, the lighting assemblies 2, 2' can also be easily inserted at any point along an already installed/assembled track 3, 3' by a fitter at a construction site and can also be removed again just as easily, in the case of some embodiments without any tools. Several such insets 2, 2' can be lined up in a quasi-seamless manner or with only a small distance or gap. Subsequently, the profile lighting system 100, 100' can be covered with a continuous translucent cover 50, 50', thereby generating, for example, a continuous band of light several meters long.

A lighting assembly 2, 2' can be up to about 3 meters long, for example. However, other lengths are also conceivable.

In variants of the above exemplary embodiments, the control device 70 or 70' and the contacting device 62 can be installed together in a supply unit.

While the rail profiles 3, 3' and the assemblies 2, 2' of the exemplary embodiments described above are each embodied in a straight line, in variants of the exemplary embodiments the profiles 3, 3' and the assemblies 2, 2' can have a curved shape, in particular a flat curved shape. The fastening devices 1, 1' also facilitate assembly in these cases. If the components 2, 3 are formed with a curved shape, the component 18 can also be formed in such a way that it follows the curved shape.

Advantageously, in the exemplary embodiments described above, the profiles 3, 3' can first be mounted separately, then the lighting assemblies 2, 2' can be inserted and these can subsequently be covered with the cover 50, 50'. The cover 50, 50' can be cut to size on site if required. Complicated wiring is avoided and any required dismantling is also significantly easier.

Although the present invention has been fully described above with reference to preferred exemplary embodiments, it is not limited to these exemplary embodiments and can be modified in a variety of ways.

REFERENCE LIST

1, 1' fastening device
2, 2' lighting assembly
3, 3' rail profile
3*a*, 3*b* side wall (rail profile)
3*a*', 3*b*' side wall (rail profile)
4, 4' body
5, 5' rear side area (lighting assembly)
6, 6' light output side (lighting assembly)
7, 7' latching element
7*a*, 7*a*' latching edge
8, 8' edge or undercut
9, 9' actuating element
10, 10' open longitudinal side (rail profile)
11, 11' first side (body)
11, 11' second side (body)
13 axis
14, 14' depth direction (rail profile)
15, 15' transverse direction (rail profile)
14, 14' longitudinal direction (rail profile)
17 geometry for manual intervention or tool intervention
18 reflector
18*r* rear side (reflector)
19, 19' printed circuit board
20, 20' LED device
21 access opening
22 shaft section
23 end face (shaft section)
24 inner side (latching element)
25 first force application section
25*a* bevelled area
25*b* flat area
26 extended area
26*b* area
27 second force application section
27*a* ramp
27*b* end section
28 swivel pin
29 opening
30 contour on the actuating element side for haptic feedback and/or locking of the actuating element
31 contour on the body side for haptic feedback and/or locking of the actuating element
40, 40' pivot axis
44, 44' inner area
45, 45' leg
46, 46' latching device
47 longitudinal edge (reflector)
48 contiguous area
50, 50' cover
60 electrical conductor means
61 conductor
62 contacting device
63 contact element
70, 70' control device
100, 100' lighting arrangement
P, P' arrow

The invention claimed is:

1. A fastening device (1; 1') for fastening a lighting assembly (2; 2') in an elongate rail profile (3; 3') open on one longitudinal side (10; 10'), wherein the fastening device (1; 1') is adapted to be mechanically coupled to the lighting assembly (2; 2') and has a body (4; 4') through which the lighting assembly (2; 2') can be overlapped in sections from a rear side area (5; 5') of the same, which faces away from a light output side (6; 6') of the lighting assembly (2; 2');

wherein the fastening device (1; 1') has latching elements (7; 7') which are set up to snap in a latching manner into an edge (8; 8') running along the rail profile (3; 3') or an edge (8; 8') running along the rail profile (3; 3') to engage behind the running undercut (8; 8') of the rail profile (3; 3'); and wherein the fastening device (1; 1') has an actuating element (9; 9') or actuating elements (9; 9') which, in a state in which the fastening device (1; 1') presses into the rail profile (3; 3') holding the lighting assembly (2; 2') inserted into it, can be actuated by an operator from the open longitudinal side (10; 10') of the rail profile (3; 3') in order to release the latching elements (7; 7 ') to bring each into a release position in which they are released from the edge (8; 8') or the undercut (8; 8'), characterised in that the actuating element (9) is formed to be rotatable for release.

2. The fastening device according to claim 1, characterised in that the latching elements (7) can be locked at least in the release position by means of the actuating element (9).

3. The fastening device according to claim 1, characterised in that the fastening device (1) has two latching elements (7) on opposite sides (11, 12) of the body (4), by means of which edges (8) or undercuts (8) provided on opposite sides of the rail profile (3) can be gripped from behind in the rail profile (3) and which can be released together from the edge (8) or the undercut (8) by actuating one of the actuating elements (9).

4. The fastening device according to claim 1, characterised in that the actuating element (9) can be rotated within an angular range around an axis (13) which runs parallel to a depth direction (14) of the rail profile (3), and in particular that the latching elements (7) can be released by rotating the actuating element (9) by an angle of between 80 degrees and 100 degrees.

5. The fastening device according to claim 1, characterised in that a first force application section (25) is connected to the latching elements (7) and is provided on an inner side (24) of the latching element (7) facing the actuating element (9) or on a body section connected to the latching elements (7), the actuating element (9) has a shaft section (22) which is embodied on an end face (23) thereof with a geometry (17) for actuation by the operator by hand and/or by means of a tool, and the actuating element (9) has an extended area (26) which extends from the shaft section (22) and is in particular disk-like in some areas, with second force application sections (27), each of which is embodied with one of the latching elements (7) in order to interact with the first force-applying section (25).

6. The fastening device according to claim 1, characterised in that the actuating element (9), in particular on the extended section (26) thereof, has a plurality of contours (30) on the actuating element side which are arranged at a distance from one another and are set up in such a way that at least two of the contours (30) on the actuating element side can be detachably engaged with a contour (31) which is in particular arranged in a spring-loaded manner and is provided on the body (4) in order to effect haptic feedback in at least two different positions of the actuating element (9) and/or to lock the actuating element (9) in at least two different positions.

7. The fastening device according to claim 1, characterised in that the fastening device (1') has two latching elements (7') on opposite sides (11', 12') of the body (4') and that the fastening device (1') has two actuating elements (9') which are each associated with one of the latching elements (7').

8. The fastening device according to claim 7, characterised in that the actuating elements (9') are each connected in one piece to an assigned latching element (7') and can be pivoted, preferably elastically pivoted, together with the latter in each case about a pivot axis (40') that runs essentially parallel to a longitudinal direction (16') of the rail profile (3') in order to release the latching element (7') from the edge (8') or undercut (8').

9. The fastening device according to claim 1, characterised in that the actuating elements (9') for releasing one of the latching elements (7') can be pressed outwards by the operator essentially parallel to a transverse direction (15') of the rail profile (3').

10. The fastening device according to claim 1, characterised in that the fastening device (1; 1') can be latched to the lighting assembly (2; 2') for the mechanical coupling thereto.

11. The fastening device according to claim 1, characterised in that the fastening device (1; 1') can be mechanically coupled, in particular latched, to a housing component, a reflector (18) or a printed circuit board (19') of the lighting assembly (2; 2') provided with LED devices (20').

12. The fastening device according to claim 11, characterised in that the fastening device (1; 1') is formed to engage behind opposite longitudinal edges (47) of the housing component or reflector (18) or opposite longitudinal edges of the printed circuit board (19') in a latching manner.

13. The fastening device according to claim 1, characterised in that the body (4; 4') of the fastening device (1; 1') has an at least partially U-shaped cross-section, wherein a section of the lighting assembly (2; 2') can be accommodated in an inner area (44; 44') of the U-shape.

14. The fastening device according to claim 1, characterised in that the body (4; 4') of the fastening device (1; 1') is set up for mechanical coupling to the lighting assembly (2; 2') and the latching elements (7; 7') are formed on the body (4; 4') and that one actuating element (9) is provided as a separate component and is movably mounted on the body (4), or the latching elements (7') are each formed integrally with and elastically moveably connected to the body (4') with an allocated actuating element (9').

15. The fastening device according to claim 1, characterised in that the rail profile (3; 3') can be closed at least in certain areas with an insertable cover (50; 50') on the open longitudinal side (10; 10') of the rail profile (3; 3'), in which the lighting assembly (2; 2') can be fastened by means of the fastening device (1; 1').

16. A lighting arrangement (100; 100') with an elongate rail profile (3; 3') open on one longitudinal side (10; 10'), a lighting assembly (2; 2') and at least one fastening device (1; 1') according to claim 1;

wherein the lighting assembly (2; 2') is inserted into the rail profile (3; 3') and held in place by means of the at least one fastening device (1; 1');

wherein the fastening device (1; 1') is mechanically coupled to the lighting assembly (2; 2') and the body (4; 4') of the fastening device (1; 1') overlaps the lighting assembly (2; 2') in sections from a rear side area (5; 5') of the same which faces away from a light output side (6; 6') of the lighting assembly (2; 2'); and wherein the latching elements (7; 7') each grip an edge (8; 8') running along the rail profile (3; 3') or an undercut (8; 8') of the rail profile (3; 3') from behind in a latching manner, thereby holding the fastening device (1; 1') in the rail profile (3; 3').

17. The lighting arrangement according to claim 16, characterised in that the actuating element (9) extends through an access opening (21) in a printed circuit board (19) of the lighting assembly (2) or that the actuating elements (9') are each connected to an associated latching element (7') on the side of a printed circuit board (19') of the lighting assembly (2').

18. The lighting arrangement according to claim 16, characterised in that a conductor device (60) for providing an electrical supply voltage and/or control signals is arranged on the rail profile (3; 3'), in particular in the area of a base thereof, and in that the lighting assembly (2; 2'), having a printed circuit board (19; 19'), a control device (70; 70') and a contacting device (62) for contacting conductors (61) of the electrical conductor means (60), is formed as a unit and is connected to the at least one fastening device (1; 1 ') to form a module, wherein the module formed in this way is held in the rail profile (3; 3') by means of the at least one fastening device (1; 1').

19. The lighting arrangement according to claim 16, characterised in that the rail profile (3; 3') on the open longitudinal side (10; 10') can be closed at least in certain areas by an insertable cover (50; 50') or is at least closed in certain areas.

20. The lighting arrangement according to claim 19, characterised in that the cover (50; 50') is formed as a piece that can be inserted separately into the rail profile (3; 3') and is partially or completely translucent.

21. The lighting arrangement according to claim 19, characterised in that two or more lighting assemblies (2; 2') are held in the rail profile (3; 3'), in particular adjoining one another at the front and preferably essentially without a gap, and that the cover (50; 50') extends along a longitudinal direction (16; 16') of the rail profile (3; 3') across more than one of the lighting assemblies (2; 2').

* * * * *